(12) United States Patent
Botros et al.

(10) Patent No.: US 6,769,066 B1
(45) Date of Patent: Jul. 27, 2004

(54) METHOD AND APPARATUS FOR TRAINING A NEURAL NETWORK MODEL FOR USE IN COMPUTER NETWORK INTRUSION DETECTION

(75) Inventors: Sherif M. Botros, Foster City, CA (US); Thanh A. Diep, Los Altos, CA (US); Martin D. Izenson, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 09/427,147

(22) Filed: Oct. 25, 1999

(51) Int. Cl.[7] .................. G06F 13/00; G06F 19/00; G05B 13/02
(52) U.S. Cl. .................. 713/201; 713/200; 700/79; 700/110
(58) Field of Search ................. 713/200, 201; 700/29, 79, 108, 110

(56) References Cited

U.S. PATENT DOCUMENTS

| | | | |
|---|---|---|---|
| 5,557,686 A | | 9/1996 | Brown et al. ............ 382/115 |
| 5,677,997 A | * | 10/1997 | Talatik ..................... 706/45 |
| 5,983,242 A | * | 11/1999 | Brown et al. ............ 707/203 |
| 6,507,855 B1 | * | 1/2003 | Stern ....................... 715/513 |

OTHER PUBLICATIONS

Denault, et al., "Intrusion detection: approach and performance issues of the SECURENET system", Computers & Security, International Journal Devoted to the Study of Technical and Financial Aspects of Computer Security, NL, Elsevier Science Ltd, vol. 13, No. 6, 1994, pp. 495–508.

Denning, Dorothy E., "An Intrusion–Detection Model", IEEE Transactions on Software Engineering, US, IEEE Inc., New York, vol. SE–13, No. 2, Feb. 1, 1, 1987, pp. 222–232.

Debar, et al., "A Neural Network Component for an Intrusion Detection System", Proceedings of the Computer Society Symposium on Research in Security and Privacy, US, Los Alamitos, IEEE Comp. Soc. Press, vol. SYMP. 13, May 4, 1992, pp. 240–250.

Lunt, et al., "Knowledge–Based Intrusion Detection", Proceedings of the Annual Artificial Intelligence Systems in Government Conference, US, Washington, IEEE Comp. Soc. Press, vol. CONF 4, Mar. 27, 1989, pp. 102–107.

* cited by examiner

*Primary Examiner*—Norman M. Wright
(74) *Attorney, Agent, or Firm*—Beyer Weaver & Thomas, LLP

(57) ABSTRACT

Detecting harmful or illegal intrusions into a computer network or into restricted portions of a computer network uses a process of synthesizing anomalous data to be used in training a neural network-based model for use in a computer network intrusion detection system. Anomalous data for artificially creating a set of features reflecting anomalous behavior for a particular activity is performed. This is done in conjunction with the creation of normal-behavior feature values. A distribution of users of normal feature values and an expected distribution of users of anomalous feature values are then defined in the form of histograms. The anomalous-feature histogram is then sampled to produce anomalous-behavior feature values. These values are then used to train a model having a neural network training algorithm where the model is used in the computer network intrusion detection system. The model is trained such that it can efficiently recognize anomalous behavior by users in a dynamic computing environment where user behavior can change frequently.

33 Claims, 13 Drawing Sheets

METHOD AND APPARATUS FOR TRAINING A NEURAL NETWORK MODEL FOR USE IN COMPUTER NETWORK INTRUSION DETECTION

BACKGROUND OF THE INVENTION

1. Field of the Invention

The present invention relates generally to the field of computer systems software and computer network security. More specifically, it relates to software for examining user and group activity in a computer network and for training a model for use in detecting potential security violations in the network.

2. Discussion of Related Art

Computer network security is an important issue for all types of organizations and enterprises. Computer break-ins and their misuse have become common features. The number, as well as sophistication, of attacks on computer systems is on the rise. Often, network intruders have easily overcome the password authentication mechanism designed to protect the system. With an increased understanding of how systems work, intruders have become skilled at determining their weaknesses and exploiting them to obtain unauthorized privileges. Intruders also use patterns of intrusion that are often difficult to trace and identify. They use several levels of indirection before breaking into target systems and rarely indulge in sudden bursts of suspicious or anomalous activity. If an account on a target system is compromised, intruders can carefully cover their tracks as not to arouse suspicion. Furthermore, threats like viruses and worms do not need human supervision and are capable of replicating and traveling to connected computer systems. Unleashed at one computer, by the time they are discovered, it is almost impossible to trace their origin or the extent of infection.

As the number of users within a particular entity grows, the risks from unauthorized intrusions into computer systems or into certain sensitive components of a large computer system increase. In order to maintain a reliable and secure computer network, regardless of network size, exposure to potential network intrusions must be reduced as much as possible. Network intrusions can originate from legitimate users within an entity attempting to access secure portions of the network or can originate from illegitimate users outside an entity attempting to break into the entity's network often referred to as "hackers." Intrusions from either of these two groups of users can be damaging to an organization's computer network. Most attempted security violations are internal; that is, they are attempted by employees of an enterprise or organization.

One approach to detecting computer network intrusions is calculating "features" based on various factors, such as command sequences, user activity, machine usage loads, and resource violations, files accessed, data transferred, terminal activity, network activity, among others. Features are then used as input to a model or expert system which determines whether a possible intrusion or violation has occurred. The use of features is well-known in various fields in computer science including the field of computer network security, especially in conjunction with an expert system which evaluates the feature values. Features used in present computer security systems are generally rule-based features. Such features lead to computer security systems that are inflexible, highly complex, and require frequent upgrading and maintenance.

Expert systems that use such features generally use thresholds (e.g., "if-then-else" clauses, "case" statements, etc.) to determine whether there was a violation. Thus, a human expert with extensive knowledge of the computer network domain has to accurately determine and assign such thresholds for the system to be effective. These thresholds and other rules are typically not modified often and do not reflect day-to-day fluctuations based on changing user behavior. Such rules are typically entered by an individual with extensive domain knowledge of the particular system. In short, such systems lack the robustness needed to detect increasingly sophisticated lines of attack in a computer system. A reliable computer system must be able to accurately determine when a possible intrusion is occurring and who the intruder is, and do so by taking into account trends in user activity.

As mentioned above, rule-based features can also be used as input to a model instead of an expert system. However, a model that can accept only rule-based features and cannot be trained to adjust to trends and changing needs in a computer network generally suffers from the same drawbacks as the expert system configuration. A model is generally used in conjunction with a features generator and accepts as input a features list. However, models presently used in computer network intrusion detection systems are not trained to take into account changing requirements and user trends in a computer network. Thus, such models also lead to computer security systems that are inflexible, complex, and require frequent upgrading and maintenance.

FIG. 1 is a block diagram depicting certain components in a security system in a computer network as is presently known in the art. A features/expert systems component 10 of a complete network security system (not shown) has three general components: user activity 12, expert system 14, and alert messages 16. User activity 12 contains "raw" data, typically in the form of aggregated log files and is raw in that it is typically unmodified or has not gone through significant preprocessing. User activity 12 has records of actions taken by users on the network that the organization or enterprise wants to monitor.

Expert system 14, also referred to as a "rule-based" engine, accepts input data from user activity files 12 which acts as features in present security systems. As mentioned above, the expert system, a term well-understood in the field of computer science, processes the input features and determines, based on its rules, whether a violation has occurred or whether there is anomalous activity. In two simple examples, expert system 14 can contain a rule instructing it to issue an alert message if a user attempts to logon using an incorrect password more than five consecutive times or if a user attempts to write to a restricted file more than once.

Alert message 16 is issued if a rule threshold is exceeded to inform a network security analyst that a possible intrusion may be occurring. Typically, alert message 16 contains a score and a reason for the alert, i.e., which rules or thresholds were violated by a user. As stated above, these thresholds can be outdated or moot if circumstances change in the system. For example, circumstances can change and the restricted file mentioned above can be made accessible to a larger group of users. In this case an expert would have to modify the rules in expert system 14.

As mentioned above, the feature and expert system components as shown in FIG. 1 and conventional models used in conjunction with these components have significant drawbacks. One is the cumbersome and overly complex set of rules and thresholds that must be entered to "cover" all the possible security violations. Another is the knowledge an expert must have in order to update or modify the rule base and the model to reflect changing circumstances in the organization. Related to this is the difficulty in locating an expert to assist in programming and maintaining all components in the system.

Therefore, it would be desirable to utilize a features list generator in place of a traditional expert system that can automatically update itself to reflect changes in user and user group current behavior. It would also be desirable to derive a training process for a model used in conjunction with a features generator to generate a score reflective of changing user behavior. It would also be desirable to have the training process or algorithm accurately read anomalous user behavior. Furthermore, it would be desirable to have such a features generator be self-sufficient and flexible in that it is not dependent on changes entered by an expert and is not a rigid rule-based system.

SUMMARY OF THE INVENTION

To achieve the foregoing, methods, apparatus, and computer-readable medium are disclosed which provide computer network intrusion detection. In one aspect of the present invention, a method of artificially creating anomalous data for creating an artificial set of features reflecting anomalous behavior for a particular activity is described. A feature is selected from a features list. Normal-feature values associated with the feature are retrieved. A distribution of users of normal feature values and an expected distribution of users of anomalous feature values are then defined. Anomalous-behavior feature values are then produced. Advantageously, a network intrusion detection system can use a neural-network model that utilizes the artificially created anomalous-behavior feature values to detect potential intrusions into the computer network.

In one embodiment a normal-behavior histogram indicating a distribution of users is defined. In another embodiment it is determined whether the activity corresponding to anomalous feature values are performed more or less frequently than normal. In yet another embodiment an anomalous-behavior histogram indicating an expected distribution of users is defined. In yet another embodiment the anomalous-behavior histogram is sampled. In yet another embodiment numerous anomalous-behavior feature values for each feature in the list of features is produced thereby creating a set of numerous anomalous-behavior feature values. In yet another embodiment an anomalous features list from a set of numerous anomalous-behavior feature values is derived.

In another aspect of the present invention a method of training a model for use in a computer network intrusion detection system is described. Anomalous feature values are defined and normal feature values are retrieved. A ratio of anomalous feature values and normal feature values is determined. A particular amount anomalous feature values and normal feature values are used as input to the model according to the ratio. By inputting the feature values based on the ratio, the model utilizes the particular amount of anomalous feature values and the particular amount of normal feature values to derive a score for a user activity.

In one embodiment, the model is trained using a neural network algorithm. In another embodiment, a probability factor for use in determining the ratio of anomalous feature values and normal feature values is derived. In another embodiment, an anomalous feature data list from numerous anomalous feature values is randomly selected. Similarly, a normal feature data list from numerous normal feature values is randomly selected. In yet another embodiment, a desired score is assigned for the selected feature data list used as input to the model.

In another aspect of the present invention, a computer network intrusion detection system for detecting possible violations in a computer network is described. The system includes user activity files containing records relating to activities performed by users on the system and historical data files containing user historical data and user group or peer historical data. A feature generator generates a features list and accepts as input the user historical data and the peer historical data. A model is trained to process the features list and output a final score indicative of whether a user activity is a potential intrusion or violation in the computer system.

In one embodiment the user historical data contains a series of user historical means and user historical standard deviations and the peer historical data contains a series of peer historical means and peer historical standard deviations. In another embodiment the features generator accepts as input the user historical means and the user historical standard deviations. In yet another embodiment the computer network intrusion detection system contains a set of features reflecting anomalous behavior. In yet another embodiment the computer network intrusion detection system has an anomalous feature data store for storing sets of anomalous feature values. In yet another embodiment the network intrusion detection system also includes a data selector for selecting either normal feature data or anomalous feature data based on a predetermined ratio and a neural network training component that accepts as input either the normal feature data or the anomalous feature data as determined by the data selector.

BRIEF DESCRIPTION OF THE DRAWINGS

The invention may be best understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for training a model using historical and statistical data in conjunction with hypothetical anomalous behavior data for use in a computer network intrusion detection program is described in the various figures. By using the historical data, a feature generator used to generate a features list can take into account changing behavior of the user and of the user's peers, and does not depend on extensive domain knowledge.

1. Features List Generation

Figure 1:
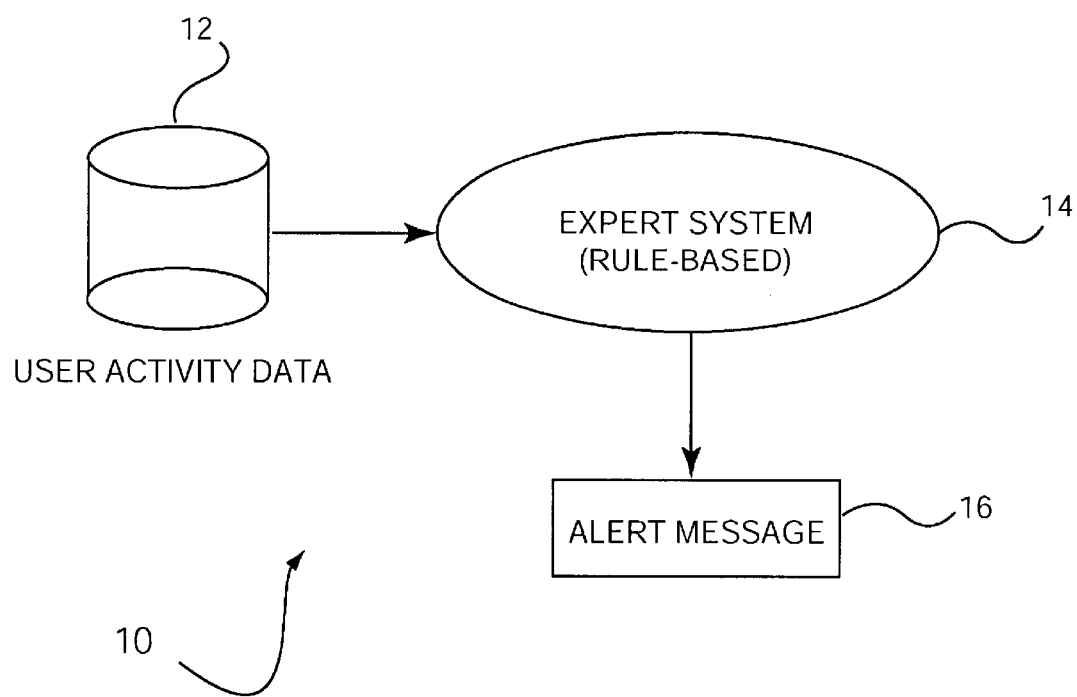
FIG. 1 is a block diagram of a features/expert system component of a security system in a computer network as is presently known in the art.
Figure 2:
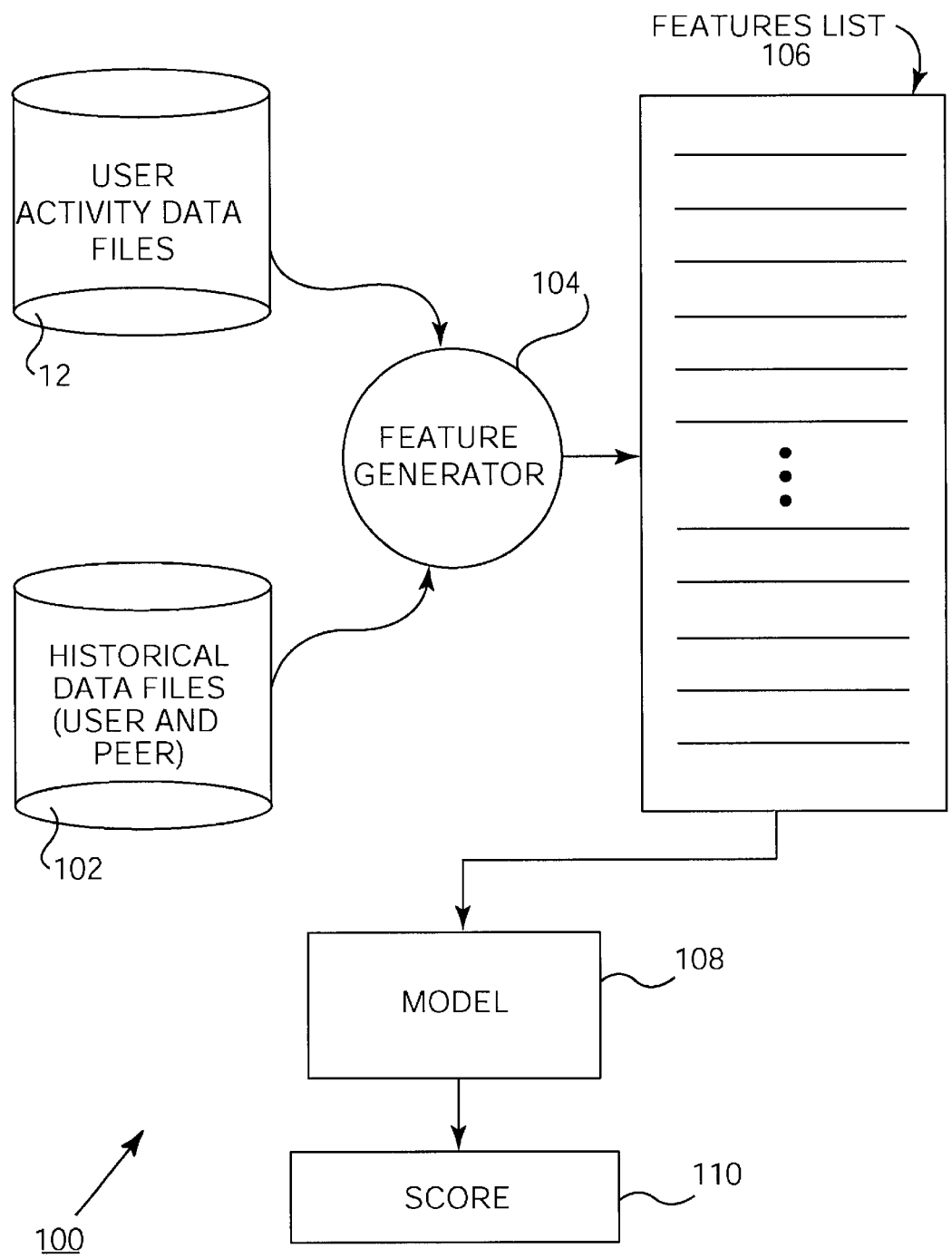
FIG. 2 is a block diagram of a computer network security system in accorded with the described embodiment of the present invention.

FIG. 2 is a block diagram of a computer network security system 100 in accordance with the described embodiment of the present invention. User activity files 12 are generally the same as those shown in FIG. 1. These files contain raw user data generated from various system resources and, in the described embodiment, are parsed and organized according to user and time of activity. They are described in greater detail in FIG. 3. Historical data 102 contains data relating to prior activity performed by a user and cumulative data of activities performed by the peer group (including the user) in a particular time frame. In other embodiments, smaller or larger groups, different from the user peer group, can be monitored. In the described embodiment the peer group is all users in a particular system who have logged in for a particular time period, such as a typical work day. The generation of user historical data is described in greater detail in FIG. 4 and the generation of user peer group historical data is described in greater detail in FIG. 5.

User activity files 12 and historical data 102 are used as input to a feature generator or builder 104. In the described embodiment, feature generator 104 is implemented involving an equation for calculating a time-weighted mean, discussed in greater detail in FIGS. 6 and 7. The output from feature generator 104 is a features list 106. In the described embodiment, features list 106 contains 47 features which can be classified into several different categories such as violations, user activities, computer and network loads, and so on. Characteristics of feature list 106 are described in greater detail in FIG. 8. Individual features from features list 106 are used as input to a model 108. As is well known in the field of computer science, there are many different model processes, such as linear regression, Markov models, graphical models, and regression models. A model is trained to evaluate features to recognize the possibility of a network intrusion. By training model 108 to process certain types of features, it can recognize potential intrusions. As is well known in the art, a model can accept different types of features. One example of a feature is user login failure, such as the time between login failures for a particular user. Once the model receives all input features, it calculates a score 110. This score is based upon the input features and how the model has been trained. In the described embodiment, the model is trained using a neural network algorithm. A score 110 can be normalized to a number between 0 and 1000, a high number indicating a stronger possibility of an intrusion. An advantageous method for training a suitable model is discussed in FIGS. 9 through 14.

Figure 3:
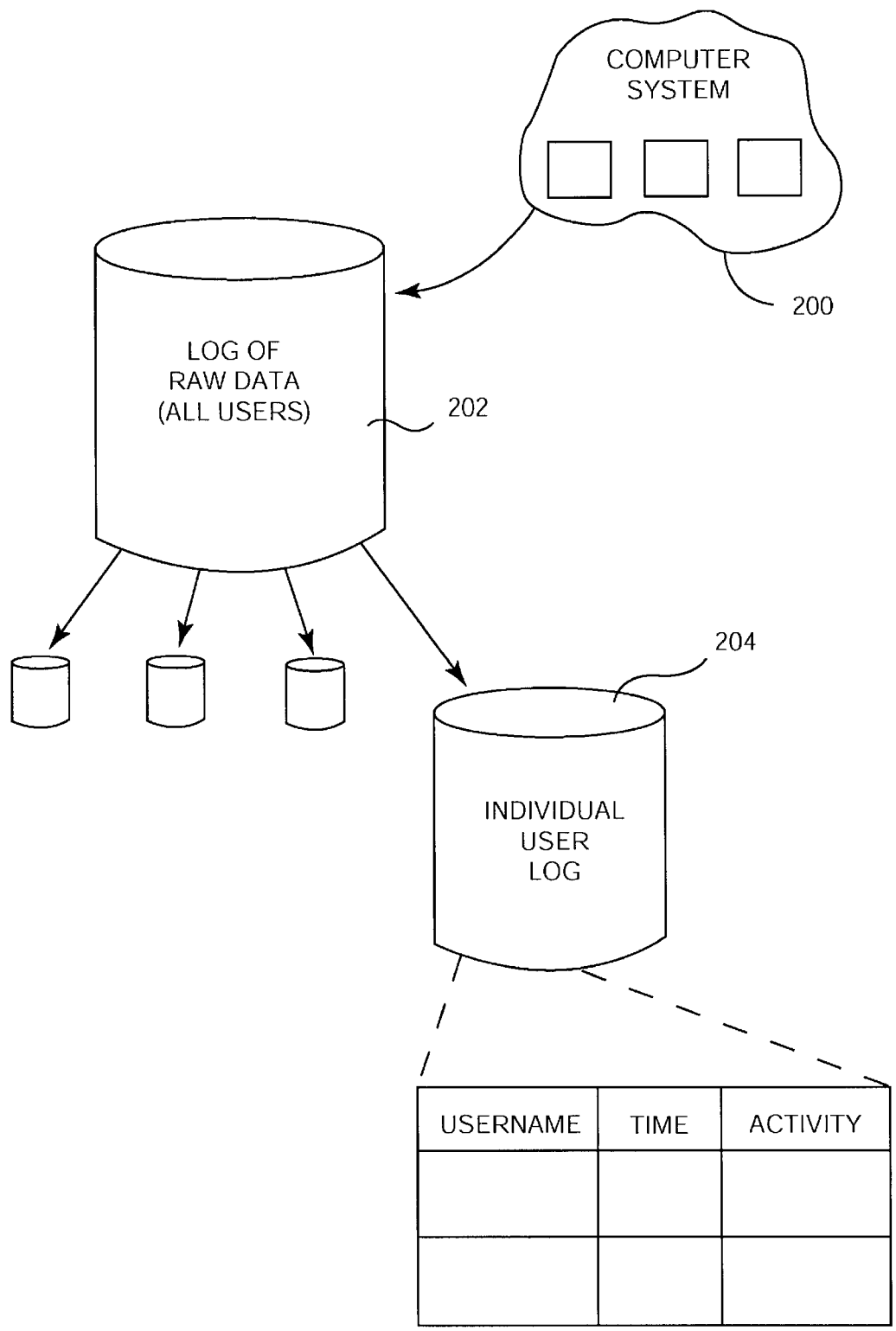
FIG. 3 is a schematic diagram showing the formation of user activity log files, or the raw user data, in accordance with one embodiment of the present invention.

FIG. 3 is a schematic diagram showing the formation of user activity files 12, or the raw user data, in accordance with one embodiment of the present invention. As mentioned above, user activity files 12 contain raw data of activities performed by users. As described below, user activity files 12 are made up of numerous individual user logs, such as user log 204 of FIG. 3. In the described embodiment, the users are on one particular computer system, typically supported by a mainframe computer and operating system. In other embodiments, the raw data can come from several computer systems each supported by different computers. Similarly, score 110 can be derived from data from one or more computer systems and can measure potential intrusions for one or all systems. A computer system 200 is shown containing a number of sources from which raw user activity data is drawn. Examples of these sources or files include operating system files containing executed commands, operations on programs, exceptions, operations on files, and other more data-specific files such as badge-in data. In the described embodiment the sources are maintained by the Multiple Virtual Storage ("MVS") operating system of the IBM Corporation, and used on IBM mainframe computers. These data sources are part of the MVS operating system and are created and maintained as part of the operating system. The process can be used in computer systems using operating systems other than MVS such as a Unix-based operating system. Using the example from above, to determine the time between login failures, the intrusion program checks user activity files 12.

A raw data log 202 contains user activity for all users logged in a particular computer system such as system 200. Computer system 200 parses raw data log 202 according to user and time of activity thereby creating a series of individual user logs, such as user log 204. In the described embodiment, user log 204 is a series of variable length records containing a user name, a timestamp of when the user activity occurred and the name of the specific user activity, as well as other information depending on the user activity or command performed. After data from the system resources is parsed according to user, user activity data is retained or kept in the form of user activity files 12, used as input to feature generator 104.

Figure 4:
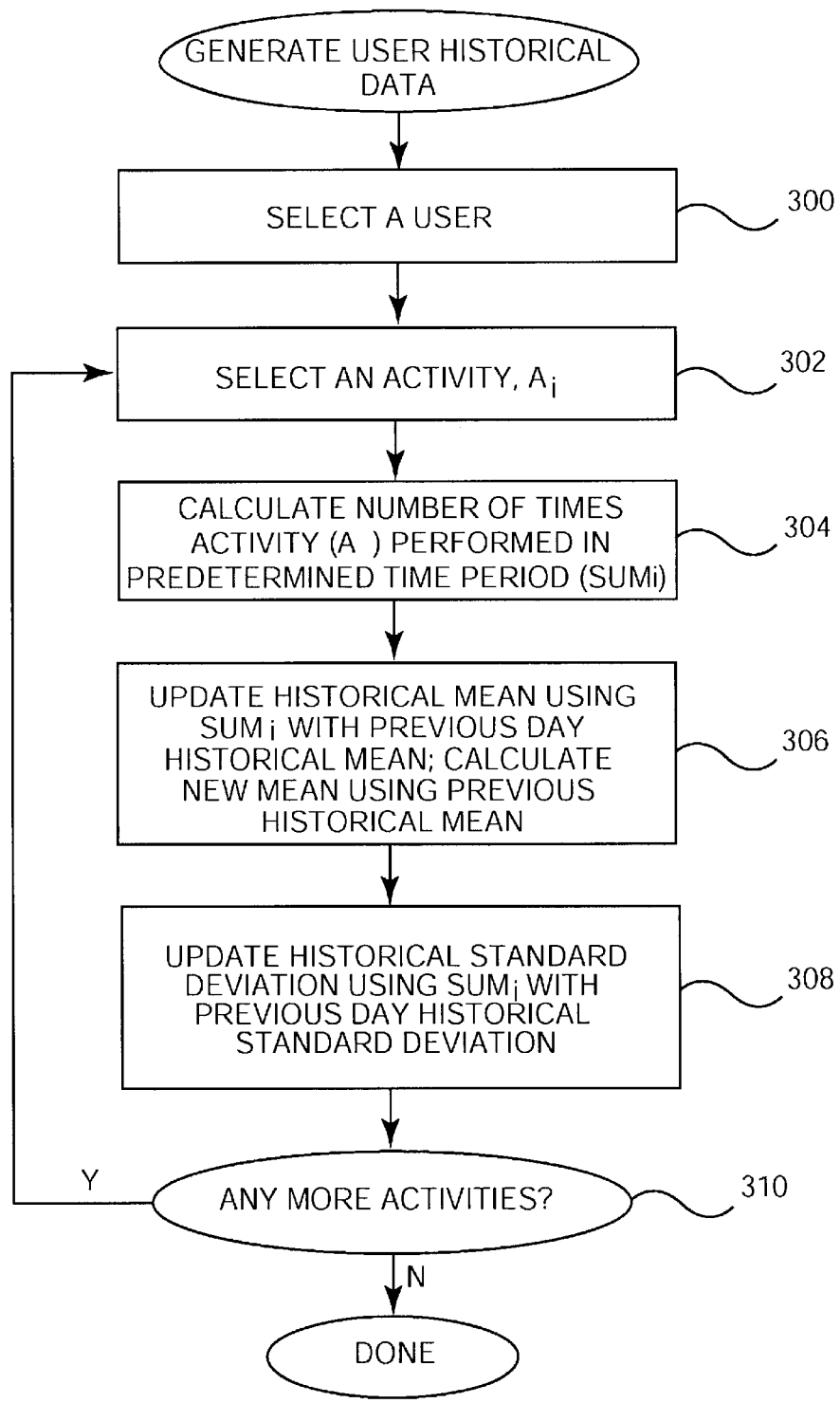
FIG. 4 is a flow diagram of a process for generating user historical data in accordance with one embodiment of the present invention.

FIG. 4 is a flow diagram of a process for generating user historical data in accordance with one embodiment of the present invention. In the described embodiment the process is performed at the end of a user work day for each user logged in and for each computer system in an organization or enterprise. Thus, in the described embodiment, user historical data is generated once a day. In other embodiments, historical data can be generated more or less frequently depending on characteristics of the system, number of users, and the degree of intrusion detection desired. Generally, each activity is examined for a particular user and a statistical mean, or equivalent value, is calculated for that user for a particular day.

At step 300 a user is selected from a corpus of users who have logged onto a computer system for a particular day. In the described embodiment, historical data is generated for users who have logged on and performed at least some activities during the day. At step 302 a particular activity is selected from a predetermined list of activities that are monitored by the intrusion detection system. In the described embodiment, the activities can be divided into several categories such as violations, login failures, failures related to accessing a file, normal activity, resource usage, and others. In the described embodiment there is a predetermined set of 47 activities from which activities are selected.

At step 304 the intrusion detection program determines the number of times the selected activity is performed on a particular day by the selected user. In the described embodiment this is determined using a counter. The total number of times the selected activity is performed by the user is stored as $sum_i$. $Sum_i$ is not necessarily the number of times an activity is performed. It can also represent the total resource usage, total number of bytes transferred, among other quantities (i.e., it is not necessarily a counter). At step 306 $sum_i$ is used to calculate a historical mean of $sum_i$ by the user alone. In the described embodiment this is done by comparing $sum_i$ to a historical mean calculated for all or a predetermined number of previous sums. This historical mean is a time-weighted mean updated based on the new $sum_i$. In addition, the previous historical mean (i.e., the historical mean from the previous login period) is updated to reflect the new $sum_i$. The new user historical mean is saved in user and peer historical data file 102 as shown in FIG. 2.

At step 308 $sum_i$ is used to update a user historical standard deviation. In the described embodiment, this standard deviation is calculated for the selected user for that particular day. As with the user historical mean, a historical standard deviation is calculated using $sum_i$ and is stored in user historical file 102 from where it is used as input to feature generator 104. At step 310 the intrusion detection program determines whether there are any remaining activities to be examined from the activity list. If so, control returns to step 302 where the next activity is selected and the process is repeated. If there are no more activities in the list, the processing for generating historical data for a single user for a particular day is complete. The user historical standard deviation and historical mean values collectively comprise the user historical data which is subsequently used as one input to features generator 104.

Figure 5:
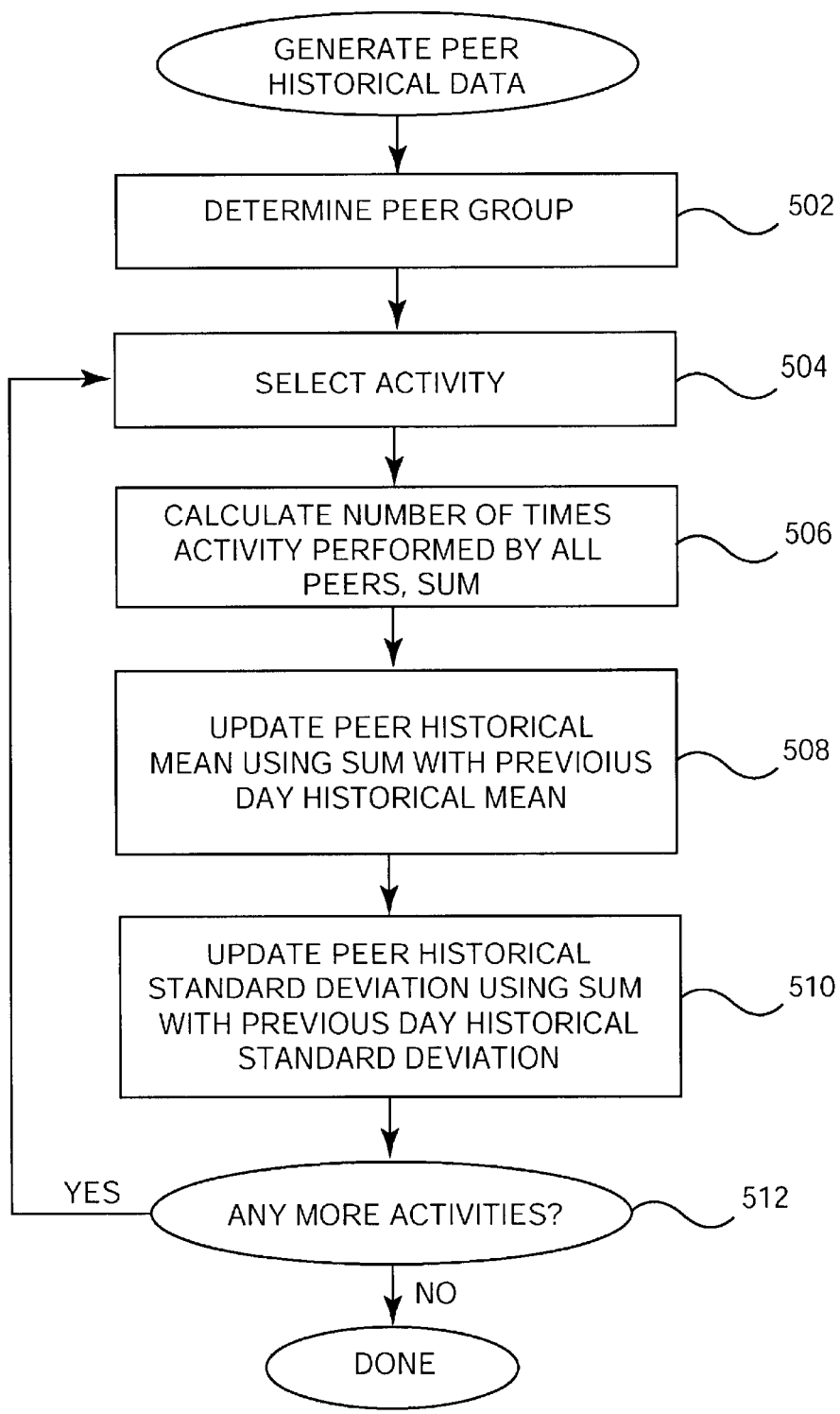
FIG. 5 is a flow diagram of a process for generating peer historical data in accordance with one embodiment of the present invention.

FIG. 5 is a flow diagram of a process for generating peer historical data in accordance with one embodiment of the present invention. This process is different from that depicted in FIG. 4 in that the historical data calculated here relates to the entire group of users logged onto a computer system for a particular day instead of just one selected user. In the described embodiment, this peer group includes the selected user as well. The peer group (which can be viewed as a fictitious user) can change frequently depending on who logs on the computer system.

At step 502 a peer group is formed based on all the users logged on the computer system that day. In other embodiments, there can be more than one computer system from which a peer group is formed or certain users from all those logged on may be excluded from the peer group if needed. Once the peer group is formed, an activity is selected at step 504. The activities are from the same list of activities used in step 302 of FIG. 4, having 47 activities in the described embodiment.

At step 506 another $sum_i$ is calculated based on the number of times each person in the peer group performed the selected activity in a particular time period. It is possible that some of the users in the peer group may not have performed the selected activity. At step 508 a peer historical mean is updated using $sum_i$ in a manner similar to calculating the user historical mean. In the described embodiment this is done by comparing sums to a historical mean calculated for all or a predetermined number of previous sums. This peer historical mean is also a time-weighted mean updated based on the new $sum_i$. In addition, the previous historical mean (i.e., the historical mean from the previous login period) is updated to reflect the new $sum_i$. At step 510 the peer historical standard deviation is calculated in a manner similar to the user historical standard deviation as described in step 308 of FIG. 4. The peer historical mean and standard deviation values are saved in user and peer historical files 102 with the user historical data.

The peer historical standard deviation can be used to assign various weightings to the peer historical mean based on several criteria, such as time or other factors in the system. For example, a peer historical mean calculated four months prior to the present can be assigned a lighter weight than the historical mean calculated two days prior to the present with regard to determining the standard deviation. This is based on the assumption that behavior from two days ago should be given more importance than behavior from four months ago. In another example, a higher or lower weight can be assigned based on particular days of the weeks.

At step 512 the intrusion detection program determines whether there are any other activities from the predetermined list of activities to be examined. If so, control returns to step 504 where another activity is selected and the process is repeated. If there are no more activities, the process of generating peer historical data is complete.

Figure 6:
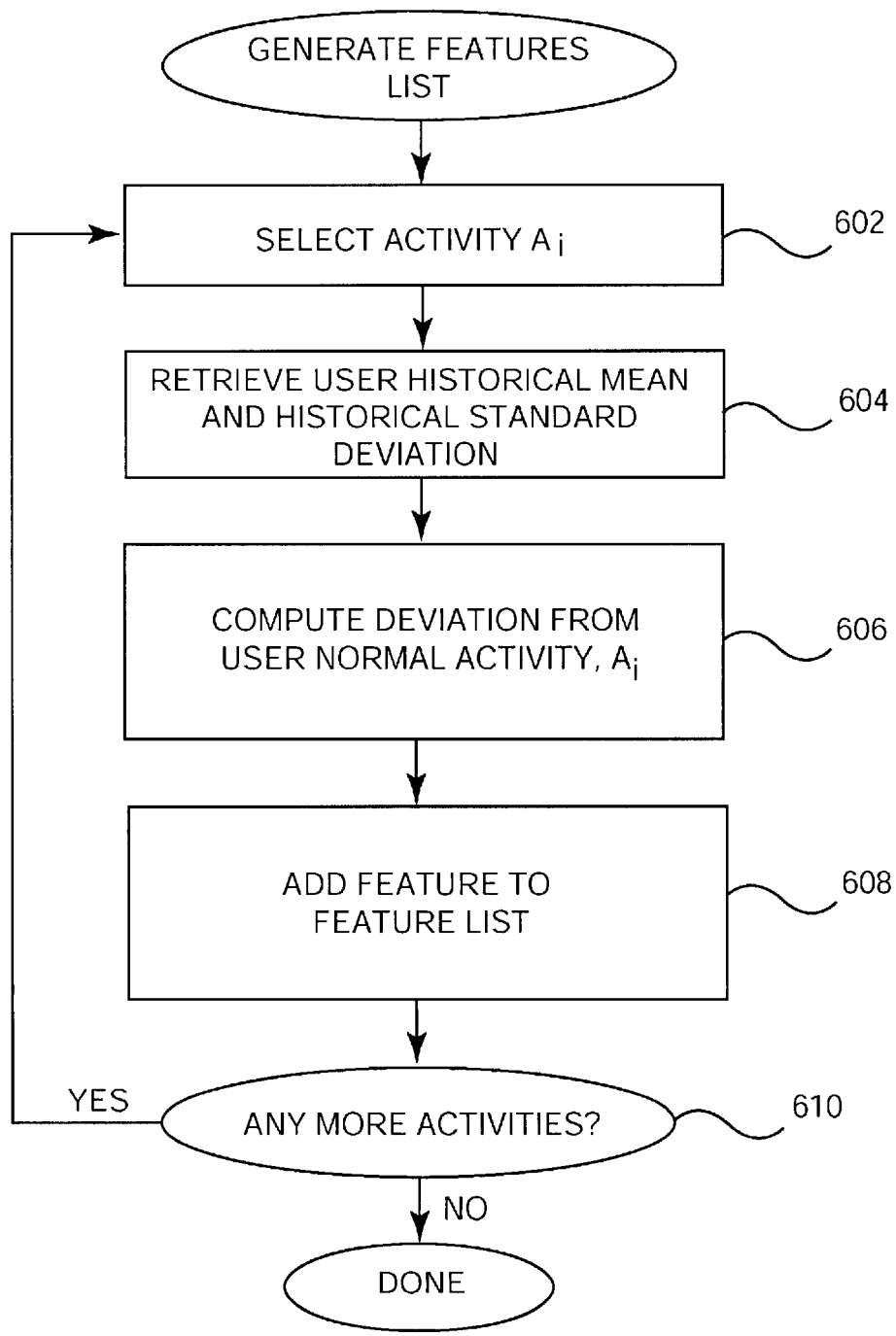
FIG. 6 is a flow diagram of a process for generating a features list containing data on a user's activity in accordance with one embodiment of the present invention.

FIG. 6 is a flow diagram of a process for generating a features list containing data on a user's activity in accordance with one embodiment of the present invention. The process of FIG. 6 depicts generation of a features list for a particular user for a particular time period, such as one day. The time period can be adjusted based on the needs of the systems and the desired accuracy of the intrusion detection program. In the described embodiment, the features list is a list of real numbers ranging from –5 to 5 where a low negative number indicates behavior less than normal and a positive number indicates behavior more frequent than normal. At step 602 an activity performed by a particular user is chosen from that user's activity list as was done in step 302 of FIG. 4. In the described embodiment, a features list, such as features list 106, is organized first by user, and within a user, by activity. In other embodiments the features list can be organized differently depending on requirements of the system. At step 604 the features generator, such as features generator 104, retrieves the user's historical mean and historical standard deviation for the selected activity. These values are drawn from user and peer historical data file 102.

At step 606 the features generator determines whether a user's activity for that day with respect to the selected activity is normal or deviates from past behavior. In the described embodiment this determination is made by calculating a normalized deviation of the user's historical mean from the user's activity for that particular day. That is, how far off the user's behavior is from the user's historical mean. In the described embodiment, this is done by subtracting the user historical mean from the activity level and dividing the result by the user historical standard deviation. This calculation is recorded as a value in the range of −5 to 5 as described above. This value is then stored in features list 106 at step 608. A features list is described in FIG. 8 below. At step 610 the intrusion detection program determines whether there are anymore activities in the activity list for the selected user. If there are, control then returns to step 602 where another activity is selected and the process is repeated. If there are no more activities, the process of generating the user-specific portion of the features list is complete. Thus, a portion of the features list which contains each of a selected user's activities and a corresponding score indicating how close the user's actions are to previous behavior is completed.

Figure 7:
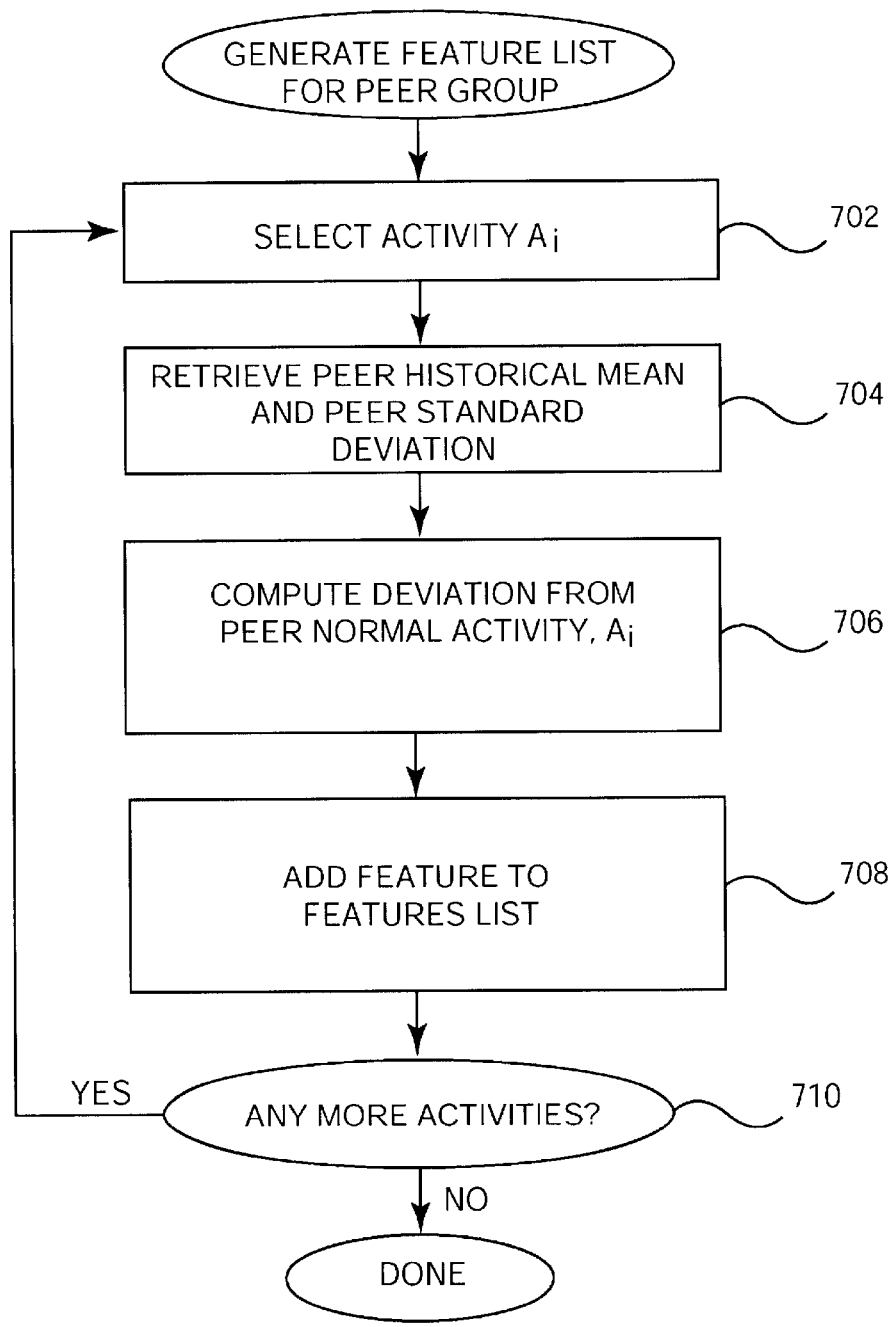
FIG. 7 is a flow diagram of a process for generating another portion of a features list related to a user's activity relative to peer activity in accordance with one embodiment of the present invention.

FIG. 7 is a flow diagram of a process for generating another portion of a features list related to a user's activity relative to peer activity in accordance with one embodiment of the present invention. The steps described here are similar to those described in FIG. 6 except values used relate to peer data instead of user data. At step 702 an activity is selected for a particular user. In the described embodiment, this step is the same as step 602. At step 704 the peer historical mean and peer historical standard deviation are retrieved from the user and peer historical data files 102. These values are computed at steps 508 and 510 of FIG. 5 using peer historical data. At step 706 the behavior corresponding to the selected activity by the user is compared to typical behavior of the user's peers for that activity. Any deviation by the user from normal peer activity is computed, i.e., any abnormal behavior is measured. This is done by subtracting the user's current activity value from the peer historical mean and dividing the result by the peer historical standard deviation. This deviation or anomalous behavior is translated into a numerical value and added to the features list 106 at step 708. As with deviation from the user's own behavior, in the described embodiment this value is measured as a real number in the range of −5 to 5. At step 710 the intrusion program determines whether there are anymore activities in the activity list. If there are, control returns to step 702. If not, the process is done and a complete features list has been created.

Figure 8:
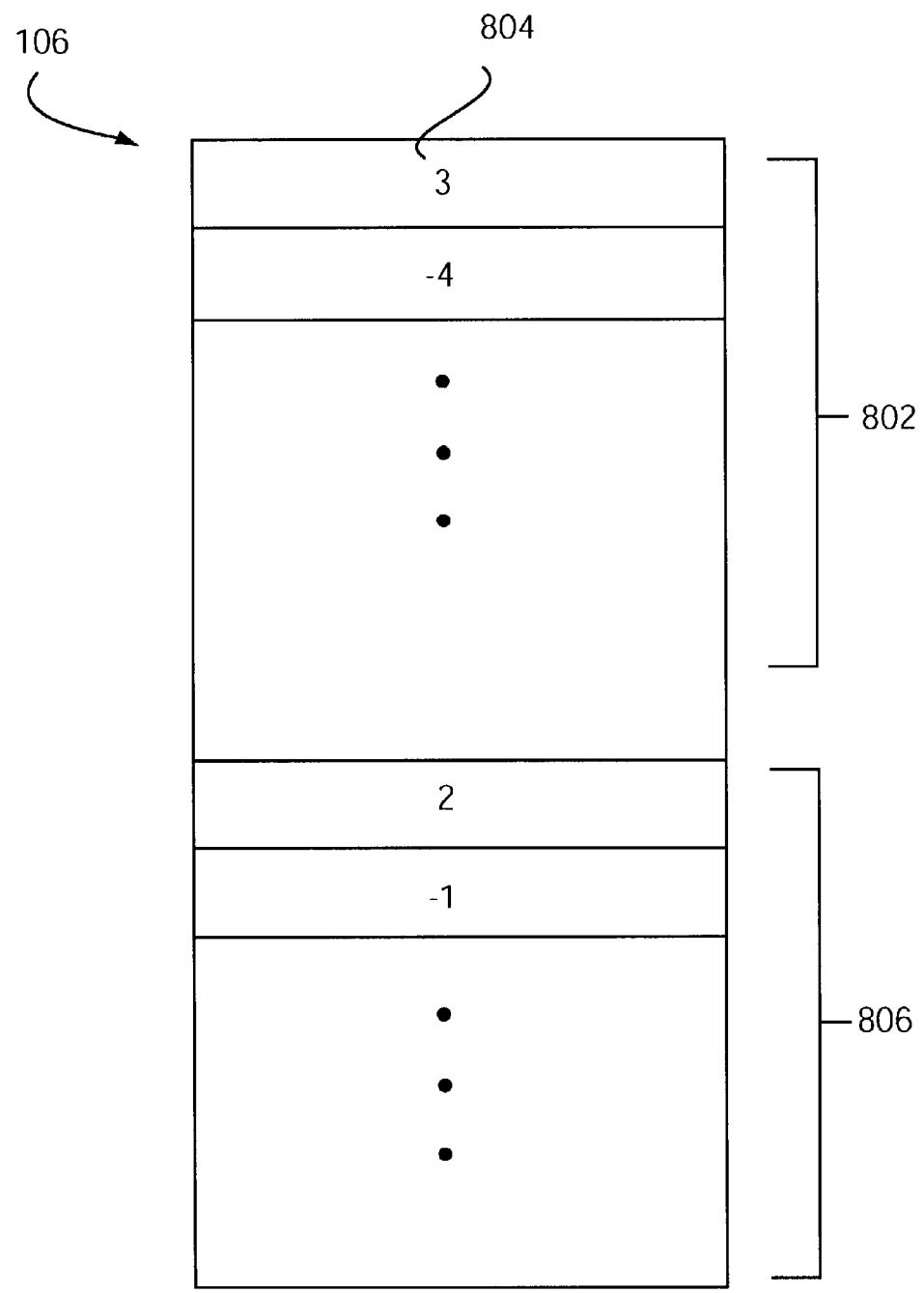
FIG. 8 is a schematic diagram of a features list in accordance with one embodiment of the present invention.

FIG. 8 is a schematic diagram of a features list in accordance with one embodiment of the present invention. As described above features list 106 contains a series of values corresponding to a deviation of the user's behavior from the user's past behavior and the behavior of the user's peer group for various activities. Features list 106 contains a series of values, each value corresponding to a particular activity for a particular user. The feature values for one user are grouped together. In the described embodiment, features for each user are divided into two sections. An example of a first section of features 802 corresponds to values comparing a user's behavior to the user's past behavior. Examples of individual values are shown as values 804. A process for generating these scores is described in FIG. 6. The number of activities tracked by the intrusion detection program can vary. Examples of various categories of these activities are described above. The types of activities monitored by the intrusion program can vary from system to system and will depend on the level and type of security desired.

A second section 806 corresponds to features values derived from deviations of the user's behavior from the user's peer behavior for a particular activity. A process for generating these values is described in FIG. 7. In the described embodiment, the number of activities in the two sections is the same. Following section 806 is another section similar to section 802 for another user. As previously explained in FIG. 2, features list 106 is used as input to model 108 trained to receive as input particular features and which outputs a final score 110. It is worth noting that a user's peers can be defined in various ways, such as by privilege users as opposed to normal users, by system, or level of activity.

2. Neural Network Training

Figure 9:
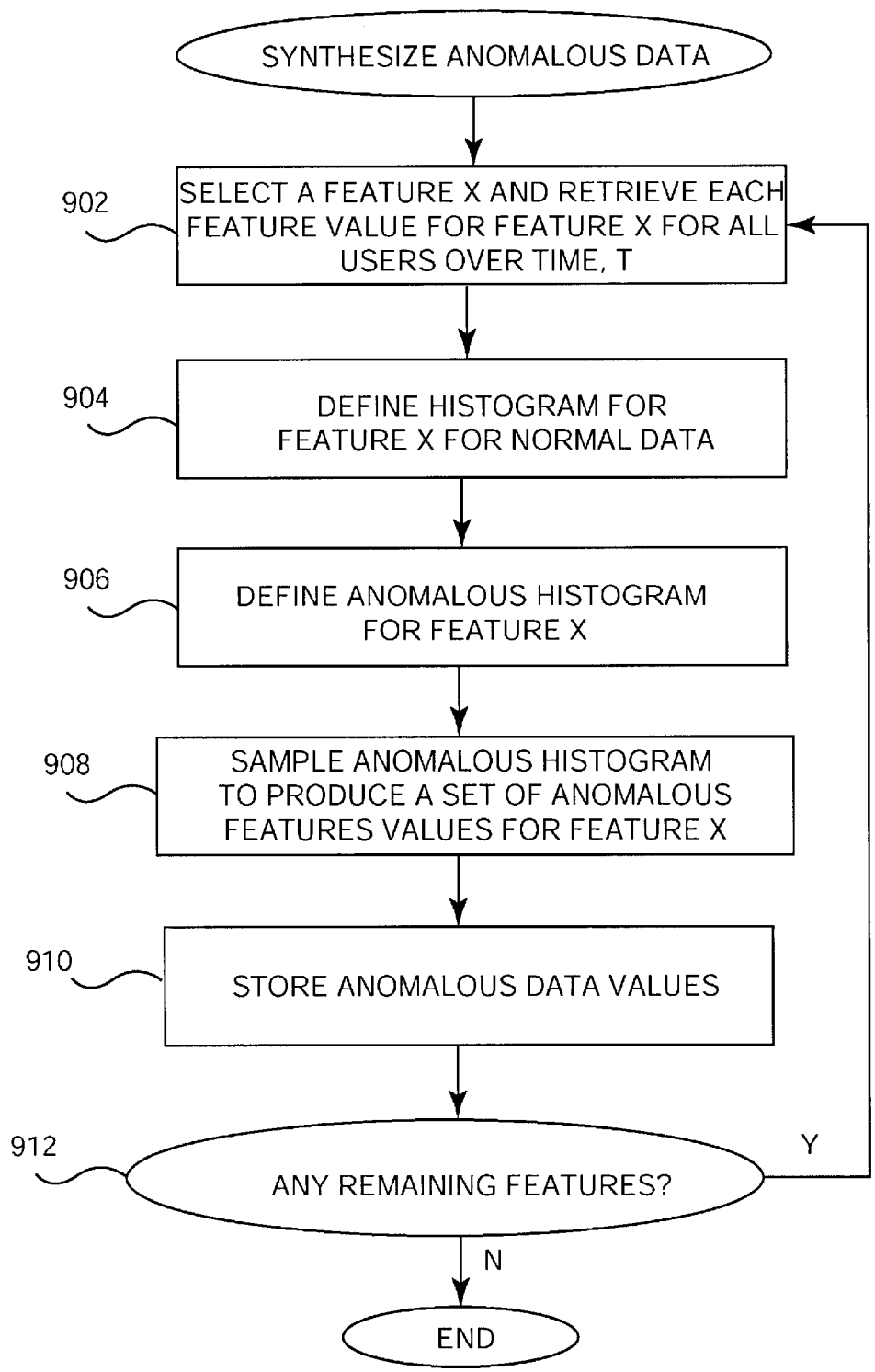
FIG. 9 is a flow diagram depicting a process of synthesizing anomalous data used to produce a set of features reflecting anomalous behavior in accordance with one embodiment of the present invention.

FIG. 9 is a flow diagram depicting a process of synthesizing or artificially creating anomalous data used to produce a set of features reflecting anomalous behavior in accordance with one embodiment of the present invention. This is done since anomalous behavior is, by definition, rare, there is a need to synthetically create examples of anomalous behavior in order to better train a neural network classifier. At step 902 the intrusion detection program selects a particular feature X, from features list 106 in the described embodiment. It retrieves each value for feature X for all users or a subgroup of users in a computer system over a predetermined time period. In the described embodiment time period T is in the range of four to six months. In other embodiments the time range can vary depending on the desired degree of accuracy of the intrusion detection program. Thus, after step 902 the intrusion detection program has typically thousands of values corresponding to users on the system for feature X over a given time period T. It is useful to note here that the values retrieved at step 902 are "normal" data values reflecting normal or non-anomalous behavior. This data is subsequently used to train model 108 of the network intrusion detection system.

Figure 10:
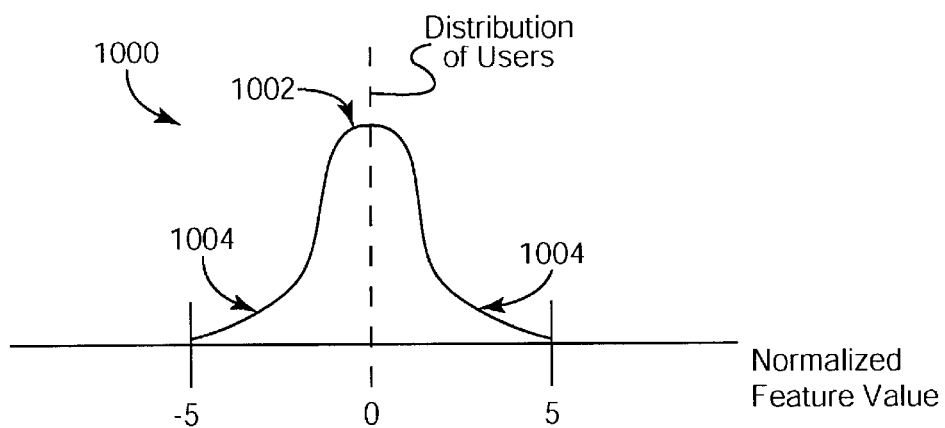
FIG. 10 is a histogram graph showing the distribution of normal feature values for a selected feature for all users over a predetermined period of time.

In step 904 a histogram or density graph is defined for the normal data gathered at step 902. An example of a histogram for normal data is shown in FIG. 10. In the described embodiment the feature values are normalized to a value between −5 and +5. Generally, most normal behavior for an activity will have a normalized feature value close to the zero value range, indicating normal or non-anomalous behavior. Anomalous behavior for a particular feature has values closer to −5 or +5 depending on the activity. Generally, a normalized feature value closer to −5 indicates that the particular activity is being performed less frequently than normal and a value closer to +5 indicates the opposite. Characteristics of the histogram are described in greater detail in FIG. 10.

Figure 11:
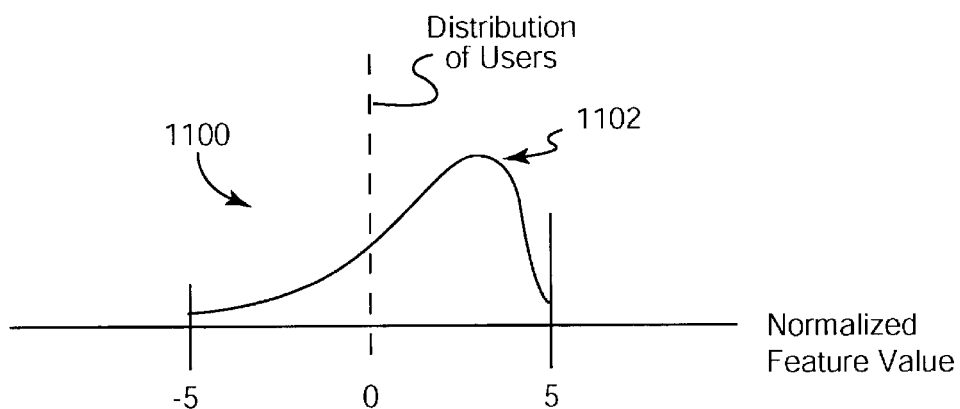
FIG. 11 is a histogram graph showing the distribution of anomalous feature values or a selected feature for all users over a predetermined period of time.

At step 906 the intrusion detection program artificially defines a second histogram for anomalous data. A sample anomalous histogram is depicted in FIG. 11. In the described embodiment, this histogram is created by a modeler or network security analyst to reflect what would be expected as anomalous behavior for a particular activity. That is, if behavior with respect to this activity were not normal, would the activity be performed less or more often and by what percentage of the population. The modeler or network security analyst will use his a priori knowledge about the security risk of a particular activity in designing the probability distribution of anomalous behavior.

At step 908 the intrusion detection program samples the anomalous data histogram to produce a set of anomalous feature values for the selected feature. In the described embodiment a standard method of random sampling well known in the field of statistics (i.e., sampling from a probability density) is used to sample the anomalous data histogram to produce a set of anomalous features. This step can be viewed as the reverse of steps 902 and 904 in so far as feature values reflecting anomalous behavior are derived from the anomalous histogram defined at step 906, whereas the normal data histogram was derived from normal feature values for a particular feature. In the described embodiment four thousand to ten thousand samples are taken to produce a set of anomalous feature values for the selected feature.

Figure 12:
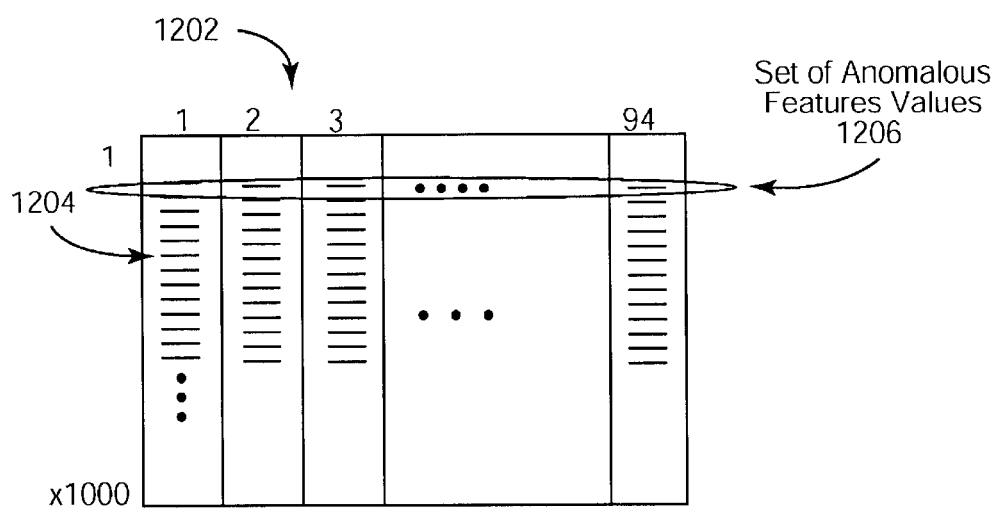
FIG. 12 is a schematic diagram of a data structure used to store sets of anomalous feature values in accordance with one embodiment of the present

At step 910 the anomalous data feature values generated in step 908 are stored for future use. The data structure used to store the anomalous data sets of the described embodiment is depicted in FIG. 12. A set of anomalous data values for a single feature is stored contiguously as further described in conjunction with FIG. 12. At step 912 the intrusion detection program checks for any remaining features. If there are features remaining, another one is selected at step 902. As mentioned above, in the described embodiment there are 94 features thereby requiring 94 loops of the process depicted in FIG. 9. In other embodiments there can be fewer or more features used in the network intrusion detection system. If there are no more features to be processed, the process of synthesizing anomalous data and feature values is complete. In the described embodiment, the anomalous feature sets are synthesized independently of each other. In other embodiments, anomalous features may depend on each other. In this case, step 906 defines a joint histogram of two or more features. At step 908 the joint histogram is sampled to produce a set of values for the dependent features. The synthesized anomalous data and feature values are stored in the same way as the normal data and feature values.

FIG. 10 is a histogram graph showing the distribution of normal feature values for a selected feature for all users over a predetermined period of time. The y-axis of histogram 1000 represents the number of users having a particular feature value represented by the x-axis. The bounds on the x-axis are the upper and lower limits of the normalized feature values, −5 and +5. As shown in FIG. 10, the highest number of users fall in the zero feature value range 1002 as would be expected for normal behavior. The number of users decreases significantly as the feature values approach −5 and 5, shown as portions 1004 of the graph. As mentioned above a normal data histogram is defined from normal feature values for a selected feature for all users over a given time length, such as four to six months. The normal data histogram is used to defined what constitutes normal patterns and can be used to model anomalous behavior histograms.

FIG. 11 is a histogram graph showing the distribution of anomalous feature values for a selected feature for all users over a predetermined period of time. As with FIG. 10, the y-axis of histogram 1100 represents the number of users having a particular feature value represented by the x-axis. The difference in FIG. 11 is that the data used to define the histogram is not actual data retrieved from the computer system but data devised by a modeler or systems security analyst to reflect expected anomalous behavior for the activity corresponding to a selected feature. This process is described in step 906 of FIG. 9. In the described embodiment there is one anomalous histogram for one normal histogram. The anomalous histogram shown in FIG. 11 shows a high number users having an unusually high feature value indicating anomalous behavior. For example, the anomalous feature values shown in FIG. 11 may correspond to the number of illegal logins during a specific time period. Because the number of logins is higher than what would normally be expected (i e., normally one or two attempts), the feature values are distributed near the high positive end 1102 of histogram 1100, as shown in FIG. 11. The bounds on the x-axis are the upper and lower limits of the possible normalized feature values: −5 and +5.

FIG. 12 is a schematic diagram of a data structure used to store sets of anomalous feature values in accordance with one embodiment of the present invention. A multi-column data structure 1202 includes multiple columns, such as column 1204, each having numerous anomalous feature values for a single feature. In the described embodiment there are thousands of anomalous feature values in each of the columns. These feature values are generated at step 908 of FIG. 9 by performing a random sampling of the anomalous histogram such as histogram 1100. Because there are 94 features in the described embodiment, data structure 1202 has 94 columns, one for each feature. Thus, if viewed across or horizontally, from left to right, data structure 1202 contains thousands of anomalous features lists, similar in structure to normal features list 106. An example of such an anomalous feature list is shown as horizontal cross-section 1206.

Figure 13:
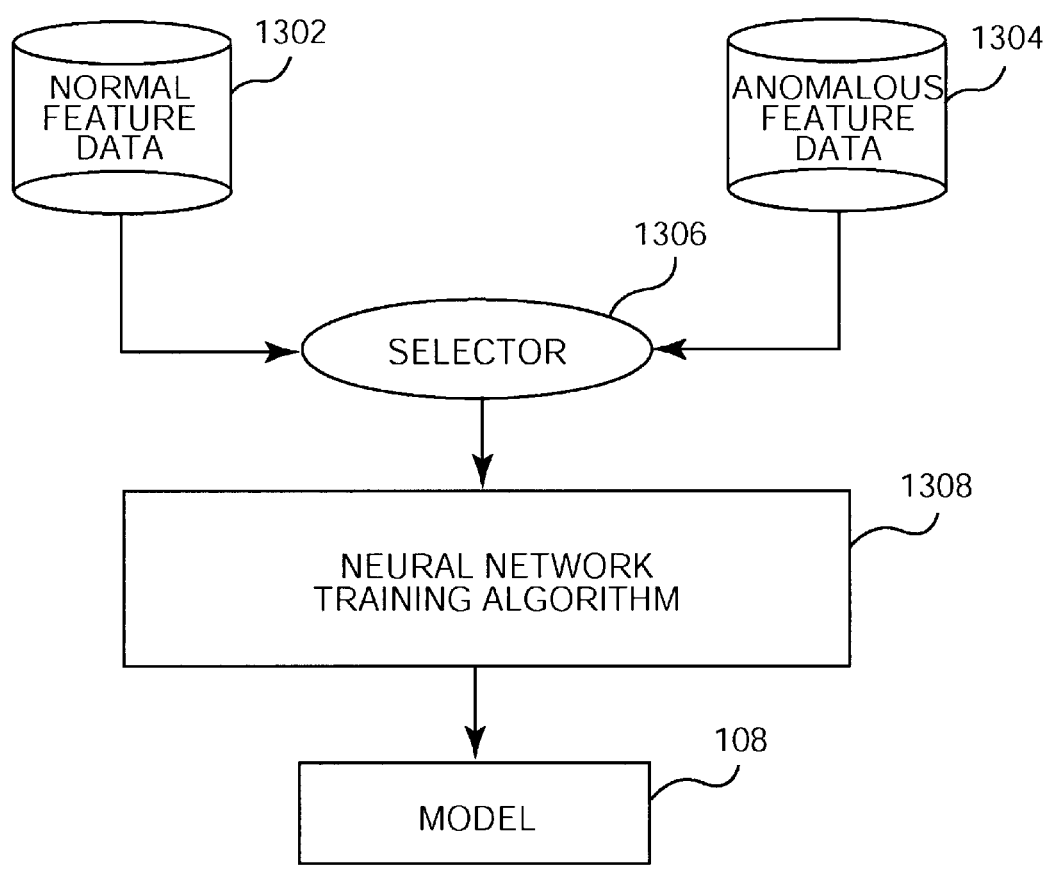
FIG. 13 is a block diagram showing components for training a model using a neutral network training algorithm in accordance with one embodiment of the present invention.

FIG. 13 is a block diagram showing components for training a model using a neural network training algorithm in accordance with one embodiment of the present invention. Normal feature data 1302 and anomalous feature data 1304 for a single feature, both generated in FIG. 9, are input to a selector 1306. Selector 1306 is configured by a modeler to route a certain amount of normal feature data 1302 and a certain amount of anomalous feature data 1304 as input to a neural network training algorithm component 1308. In the described embodiment, selector 1306 is needed because model 108 should be provided with predominantly normal feature value data and less frequently with anomalous feature value data. Thus, selector 1306 is configured to provide a ratio or mix of "good" and "bad" data to be used as input for training model 108. All other aspects of training model 108 are performed by neural network training algorithm component 1308 and are known in the field of machine learning and neural networks as described in "Neural Networks for Pattern Recognition," by Christopher Bishop, Oxford University Press, 1995, incorporated herein by reference for all purposes. The training algorithm used in the described embodiment is a back-propagation algorithm. The training algorithm 1308 produces the parameters of model 108. Training algorithm component 1308 represents the training phase or segment of model 108. Model 108 represents the actual execution of the model used in the computer network intrusion detection system.

Figure 14:
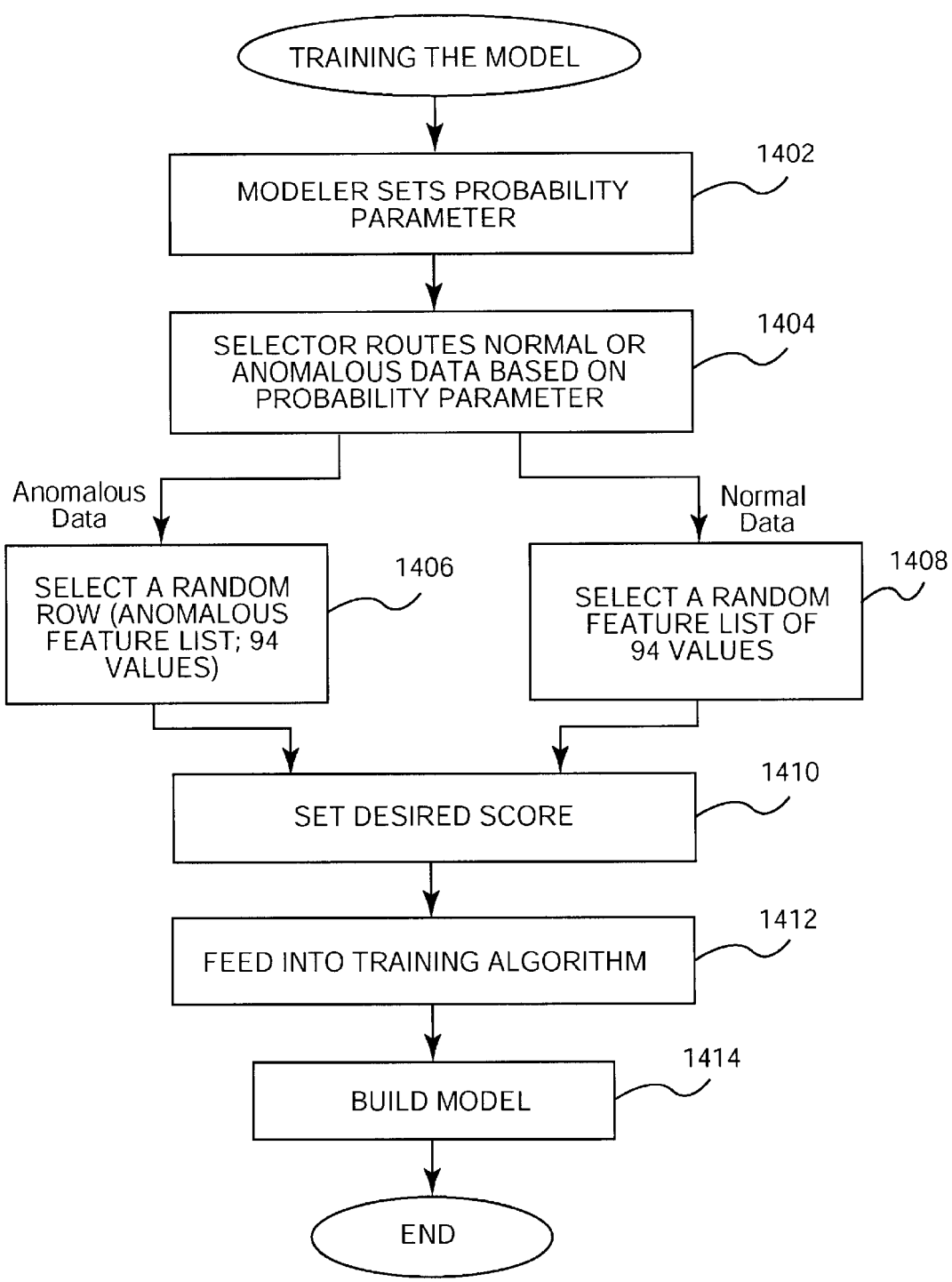
FIG. 14 is a flow diagram of a process for training a model for use in a network intrusion detection system in accordance with one embodiment of the present invention.

FIG. 14 is a flow diagram of a process for training a model for use in a network intrusion detection system in accordance with one embodiment of the present invention. The process of FIG. 14 implements the system shown in FIG. 13. At step 1402 a modeler derives an appropriate probability factor. For example, a probability factor of 0.1 means that one out of ten feature data values is selected from the anomalous data set. The probability factor can be higher or lower depending on the desired sensitivity of the intrusion detection system and the tolerance of false alerts. The probability factor determines the mix or ratio of normal feature values and anomalous feature values. Thus, a probability factor of 0.1 can mean that only one anomalous feature value is allowed in for every nine normal feature values. One caveat the modeler should be aware of is not to make the probability too high thereby creating a high number of "false positives" in the system. This could desensitize the program to possible intrusions. In the described embodiment, a probability factor of 0.1 is used.

At step 1404 selector 1306, routes either normal feature data 1302 or anomalous feature data 1304 to training algorithm 1308 based on the probabilities set at step 1402. Anomalous feature data list is taken from data structure 1202, an example of which is shown as feature list 1206. Normal feature list are retrieved from lists generated by features list generator 104 as shown in FIG. 2. The selector ensures that the desired ratio of normal feature lists and anomalous features lists is maintained, typically by only allowing a limited number of anomalous features lists to be used as input to neural network training algorithm 1308.

If selector 1306 allows an anomalous feature list to be input to training algorithm 1308, control goes to step 1406 where a random row is selected from data structure 1202 containing synthesized anomalous data. If selector 1406 allows a normal features list for training algorithm 1308, a features list is selected from lists generated by features generator 104 based on actual user and peer activity. Similar to step 1406, the normal features list is chosen randomly from among other normal features lists at step 1408.

At step 1410 a modeler assigns a desired score to the anomalous or normal features list. The modeler sets what would be considered an ideal score generated by the model if given the features list selected by selector 1306. This desired or ideal score, shown as score 110 in FIG. 2, generated by model 108 is based on a particular user's activity. Thus, as part of training model 108, the anomalous features list is accompanied by a desired score. In the described embodiment actual anomalous behavior is expected to have a high score and normal activity is expected to have a low score. The feature together with an ideal score is then used as input to training algorithm 1308 at step 1412. Training algorithm 1308 uses the input to build a model used for detecting network intrusions at step 1414. In the described embodiment the model built at step 1414 is a sigmoidal feed forward neural network. In other preferred embodiments, the model maybe realized using different structures such as a radial basis function or a decision tree.

3. Computer System Embodiment

As described above, the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, matching, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities.

The present invention also relates to a computer device, system or apparatus for performing the aforementioned operations. The system may be specially constructed for the required purposes, or it may be a general purpose computer, such as a server computer or a mainframe computer, selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 15:
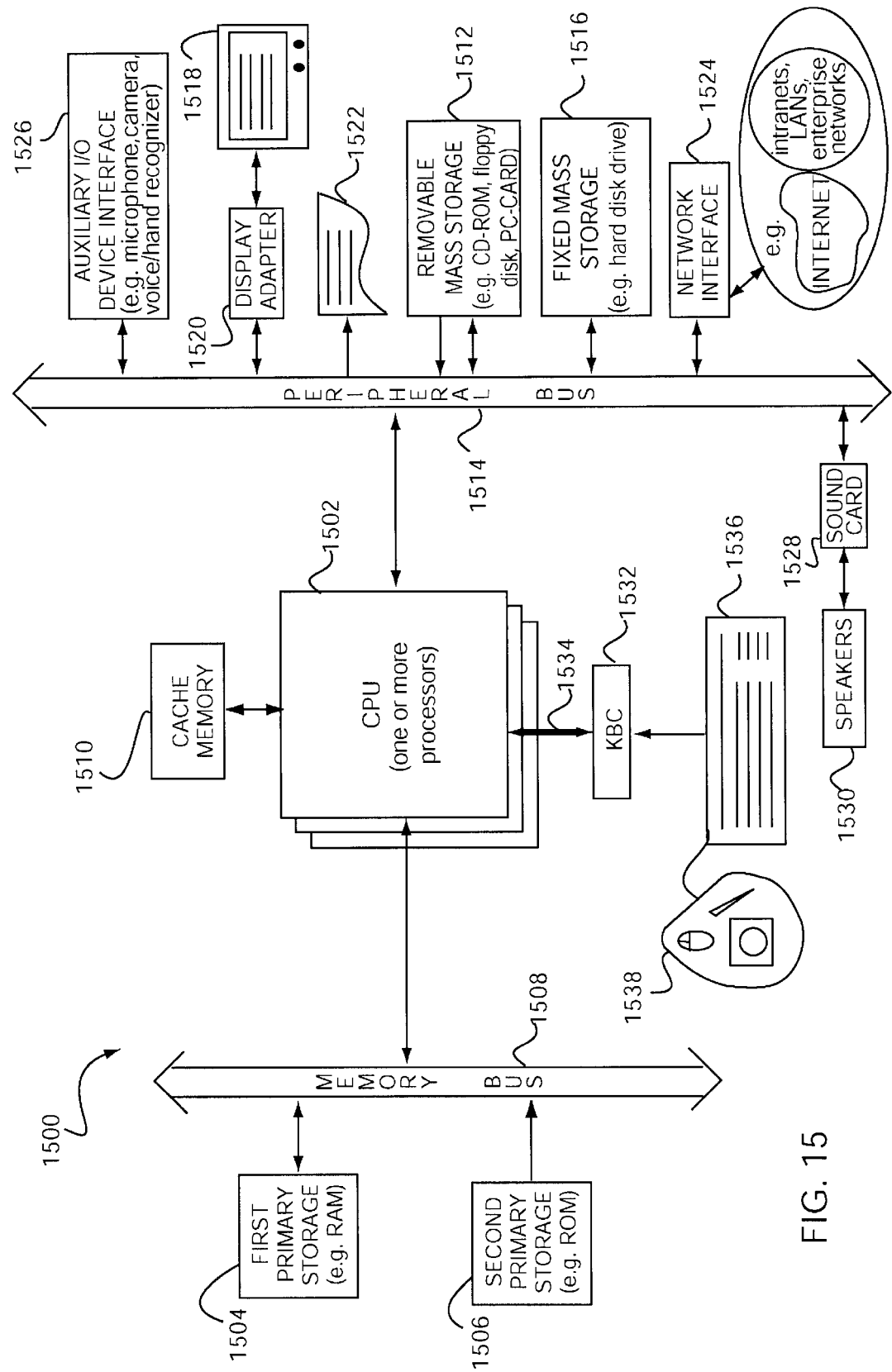
FIG. 15 is a block diagram of a typical computer system suitable for implementing an embodiment of the present invention.

FIG. 15 is a block diagram of a general purpose computer system 1500 suitable for carrying out the processing in accordance with one embodiment of the present invention. FIG. 15 illustrates one embodiment of a general purpose computer system that, as mentioned above, can be a server computer, a client computer, or a mainframe computer. Other computer system architectures and configurations can be used for carrying out the processing of the present invention. Computer system 1500, made up of various subsystems described below, includes at least one microprocessor subsystem (also referred to as a central processing unit, or CPU) 1502. That is, CPU 1502 can be implemented by a single-chip processor or by multiple processors. CPU 1502 is a general purpose digital processor which controls the operation of the computer system 1500. Using instructions retrieved from memory, the CPU 1502 controls the reception and manipulation of input data, and the output and display of data on output devices.

CPU 1502 is coupled bi-directionally with a first primary storage 1504, typically a random access memory (RAM), and Uni.-directionally with a second primary storage area 1506, typically a read-only memory (ROM), via a memory bus 1508. As is well known in the art, primary storage 1504 can be used as a general storage area and as scratch-pad memory, and can also be used to store input data and processed data, such as command and program name sequences. It can also store programming instructions and data, in the form of a message store in addition to other data and instructions for processes operating on CPU 1502, and is used typically used for fast transfer of data and instructions in a bi-directional manner over the memory bus 1508. Also as well known in the art, primary storage 1506 typically includes basic operating instructions, program code, data, and objects used by the CPU 1502 to perform its functions. Primary storage devices 1504 and 1506 may include any suitable computer-readable storage media, described below, depending on whether, for example, data access needs to be bi-directional or Uni.-directional. CPU 1502 can also directly and very rapidly retrieve and store frequently needed data in a cache memory 1510.

A removable mass storage device 1512 provides additional data storage capacity for the computer system 1500, and is coupled either bi-directionally or uni-directionally to CPU 1502 via a peripheral bus 1514. For example, a specific removable mass storage device commonly known as a CD-ROM typically passes data uni-directionally to the CPU 1502, whereas a floppy disk can pass data bi-directionally to the CPU 1502. Storage 1512 may also include computer-readable media such as magnetic tape, flash memory, signals embodied on a carrier wave, smart cards, portable mass storage devices, holographic storage devices, and other storage devices. A fixed mass storage 1516 also provides additional data storage capacity and is coupled bi-directionally to CPU 1502 via peripheral bus 1514. The most common example of mass storage 1516 is a hard disk drive. Generally, access to these media is slower than access to primary storages 1504 and 1506. Mass storage 1512 and 1516 generally store additional programming instructions, data, and the like that typically are not in active use by the CPU 1502. It will be appreciated that the information retained within mass storage 1512 and 1516 may be incorporated, if needed, in standard fashion as part of primary storage 1504 (e.g. RAM) as virtual memory.

In addition to providing CPU 1502 access to storage subsystems, the peripheral bus 1514 is used to provide access other subsystems and devices as well. In the described embodiment, these include a display monitor 1518 and adapter 1520, a printer device 1522, a network interface 1524, an auxiliary input/output device interface 1526, a sound card 1528 and speakers 1530, and other subsystems as needed.

The network interface 1524 allows CPU 1502 to be coupled to another computer, computer network, including the Internet or an intranet, or telecommunications network using a network connection as shown. Through the network interface 1524, it is contemplated that the CPU 1502 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1502 can be used to connect the computer system 1500 to an external network and transfer data according to standard protocols. That is, method embodiments of the present invention may execute solely upon CPU 1502, or may be performed across a network such as the Internet, intranet networks, or local area networks, in conjunction with a remote CPU that shares a portion of the processing. Additional mass storage devices (not shown) may also be connected to CPU 1502 through network interface 1524.

Auxiliary I/O device interface 1526 represents general and customized interfaces that allow the CPU 1502 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1502 is a keyboard controller 1532 via a local bus 1534 for receiving input from a keyboard 1536 or a pointer device 1538, and sending decoded symbols from the keyboard 1536 or pointer device 1538 to the CPU 1502. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data that can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1508, peripheral bus 1514, and local bus 1534 are illustrative of any interconnection scheme serving to link the subsystems. For example, a local bus could be used to connect the CPU to fixed mass storage 1516 and display adapter 1520. The computer system shown in FIG. 15 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the number and types of features used can vary depending on the security needs of the computer network. In another example, the methods and systems described can run in operating systems other than MVS, such as the Windows NT™ operating system or a Unix-type operating system. In yet another example, formulas or algorithms can be used to calculate the described mean and standard deviation values other than the ones described. Accordingly, the present embodiments are to be considered as illustrative and not restrictive, and the invention is not to be limited to the details given herein, but may be modified within the scope and equivalents of the appended claims.

What is claimed is:

1. A method of training a model for use in a computer network intrusion detection system, the method comprising:
    deriving a plurality of anomalous feature values;
    retrieving a plurality of normal feature values;
    determining a ratio of anomalous feature values and normal feature values; and
    inputting a particular amount of anomalous feature values and a particular amount of normal feature values according to the ratio to the model whereby the model utilizes the particular amount of anomalous feature values and the particular amount of normal feature values to derive a score for a user activity.

2. A method as recited in claim 1 wherein the model is trained using a neural network algorithm.

3. A method as recited in claim 1 further comprising deriving a probability factor for use in determining the ratio of anomalous feature values and normal feature values.

4. A method as recited in claim 1 further comprising selecting randomly an anomalous feature data list from the plurality of anomalous feature values and selecting randomly a normal feature data list from the plurality of normal feature values.

5. A method as recited in claim 1 further comprising assigning a desired score to a selected feature data list as input to the model.

6. A computer network intrusion detection system adapted to perform the method set forth in claim 1, comprising:
    a user activity file including a plurality of records relating to user activities;

a historical data file including user historical data and peer historical data;

a feature generator for generating a features list and that accepts as input the user historical data and the peer historical data; and a model trained to process the features list and output a score.

7. A computer network intrusion detection system as recited in claim 6 further comprising:

a plurality of raw data logs parsed based on user and time of activity.

8. A computer network intrusion detection system as recited in claim 6 wherein the user historical data further includes a plurality of user historical means and a plurality of user historical standard deviations.

9. A computer network intrusion detection system as recited in claim 8 wherein the feature generator accepts as input the plurality of user historical means and a plurality of user historical standard deviations.

10. A computer network intrusion detection system as recited in claim 6 wherein the peer historical data further includes a plurality of peer historical means and a plurality of peer historical standard deviations.

11. A computer network intrusion detection system as recited in claim 10 wherein the feature generator accepts as input the plurality of peer historical means and a plurality of peer historical standard deviations.

12. A computer network intrusion detection system as recited in claim 6 wherein the features list is organized by user and by activity.

13. A computer network intrusion detection system as recited in claim 6 further comprising a set of features reflecting anomalous behavior.

14. A computer network intrusion detection system as recited in claim 6 further comprising an anomalous feature data store for storing a plurality of sets of anomalous feature values.

15. A computer network intrusion detection system as recited in claim 6 further comprising:

a data selector for selecting one of either normal feature data and anomalous feature data;

a neural network training component accepting as input one of either normal feature data and anomalous feature data as determined by the data selector wherein the data selector operates based on a predetermined ratio.

16. A computer network intrusion detection system as recited in claim 15 wherein the neural network training component utilizes a back-propagation algorithm.

17. A computer-readable medium containing programmed instructions arranged to train a model for use in a computer network intrusion detection system by synthesizing anomalous data for creating an artificial set of features reflecting anomalous behavior for a particular activity, the computer-readable medium including programmed instructions for:

selecting a feature;

retrieving a plurality of normal-feature values associated with the feature;

defining a first distribution of users of normal feature values;

defining an expected second distribution of users of anomalous feature values;

producing a plurality of anomalous-behavior feature values for the feature;

determining a ratio of anomalous feature values and normal feature values; and inputting a particular amount of anomalous feature values and a particular amount of normal feature values according to the ratio to the model, whereby the model utilizes the particular amount of anomalous feature values and the particular amount of normal feature values to derive a score for a user activity.

18. A method of training a model for use in a computer network intrusion detection system by synthesizing anomalous data for creating an artificial set of features reflecting anomalous behavior for a particular activity, the method comprising:

selecting a feature;

retrieving a plurality of normal-feature values associated with the feature;

defining a first distribution of users of normal feature values;

defining an expected second distribution of users of anomalous feature values;

producing a plurality of anomalous-behavior feature values for the feature;

determining a ratio of anomalous feature values and normal feature values; and inputting a particular amount of anomalous feature values and a particular amount of normal feature values according to the ratio to the model, whereby the model utilizes the particular amount of anomalous feature values and the particular amount of normal feature values to derive a score for a user activity.

19. A method as recited in claim 18 wherein the feature is selected from a list of features.

20. A method as recited in claim 18 wherein the plurality of normal feature values reflects predominantly normal behavior.

21. A method as recited in claim 18 wherein the plurality of normal feature values is computed over a predetermined time period.

22. A method as recited in claim 18 wherein the plurality of normal feature values corresponds to a plurality of users on a computer system.

23. A method as recited in claim 18 wherein defining a first distribution of users further comprises defining a normal-behavior histogram indicating the first distribution of users.

24. A method as recited in claim 23 wherein the normal feature values are normalized to define the normal-behavior histogram.

25. A method as recited in claim 18 wherein defining an expected second distribution of users of anomalous feature values further includes determining whether the activity corresponding to the anomalous feature values would be performed one of less frequently and more frequently.

26. A method as recited in claim 18 wherein defining an expected second distribution of users further comprises defining an anomalous-behavior histogram indicating an expected second distribution of users.

27. A method as recited in claim 26 wherein producing a plurality of anomalous feature values further including sampling the anomalous-behavior histogram.

28. A method as recited in claim 18 further including storing the plurality of anomalous-behavior feature values.

29. A method as recited in claim 19 further comprising producing a plurality of anomalous-behavior feature values for each feature in the list of features thereby creating a set of plurality of anomalous-behavior feature values.

30. A method as recited in claim 23 wherein the normal-behavior histogram has a high distribution of users around the center and a lower distribution of users near the ends.

31. A method as recited in claim 26 wherein the anomalous-behavior histogram has a high distribution of users near one of the ends and a low distribution of users near the center.

32. A method as recited in claim 29 further comprising deriving an anomalous features list from the set of plurality of anomalous-behavior feature values.

33. A computer-readable medium containing programmed instructions arranged to train a model for use in a computer network intrusion detection system, the computer-readable medium including programmed instructions for:

deriving a plurality of anomalous feature values;

retrieving a plurality of normal feature values;

determining a ratio of anomalous feature values and normal feature values; and inputting a particular amount of anomalous feature values and a particular amount of normal feature values according to the ratio to the model whereby the model utilizes the particular amount of anomalous feature values and the particular amount of normal feature values to derive a score for a user activity.

* * * * *